United States Patent [19]

Sato

[11] 4,444,666

[45] Apr. 24, 1984

[54] METHOD OF REMOVING ANTIMONY FROM AN ANTIMONY-CONTAINING COPPER ELECTROLYTE

[75] Inventor: Hiroshi Sato, Niihama, Japan

[73] Assignee: Sumitomo Metal Mining Company Limited, Tokyo, Japan

[21] Appl. No.: 419,193

[22] Filed: Sep. 17, 1982

[51] Int. Cl.³ .............................................. B01D 15/00
[52] U.S. Cl. ........................... 210/670; 204/DIG. 13; 210/688; 423/87
[58] Field of Search .............. 210/670, 688, 694, 912; 204/DIG. 13; 423/87

[56] References Cited

U.S. PATENT DOCUMENTS 3,763,040 10/1973 Timpe et al. ........................ 210/694
4,157,946 6/1979 Hyvärinen ............................ 423/87
4,404,071 9/1983 Abe et al. .............................. 423/87

FOREIGN PATENT DOCUMENTS 664665 5/1979 U.S.S.R. .............................. 210/688

OTHER PUBLICATIONS

Butts, *Copper, the Science and Technology of the Metal, its Alloys and Compounds*, Reinhold Publishing Corp. (1954), pp. 171-173.
Journal of the Mining and Metallurgical Institute of Japan, vol. 97, No. 1122.
*Handbook of Metallurgical Technique*, Asakura Shoten Co., Ltd. (1963).
Rothschild et al., Carbon Treatment of Pyrophosphate Copper Baths for Improved Printed Wiring Board Production, Plating and Surface Finishing, Nov. 1977, pp. 53-55.

*Primary Examiner*—Ivars C. Cintins
*Attorney, Agent, or Firm*—Watson, Cole, Grindle & Watson

[57] ABSTRACT

The antimony in an antimony-containing copper electrolyte is removed by contacting the antimony-containing copper electrolyte with activated carbon at between room temperature and 60° C.

8 Claims, 1 Drawing Figure

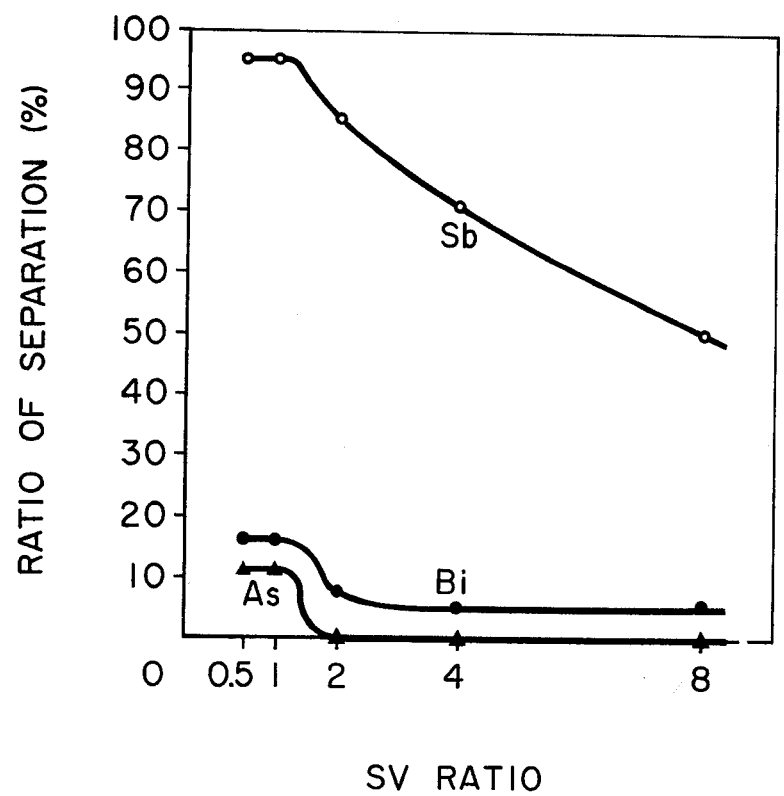

METHOD OF REMOVING ANTIMONY FROM AN ANTIMONY-CONTAINING COPPER ELECTROLYTE

BACKGROUND OF THE INVENTION

1. Field of the Invention

The present invention relates to a method of removing the antimony from an antimony-containing copper electrolyte.

2. The Prior Art

During the electrolytic refining of copper, some of the impurities contained in the anode dissolve into the electrolyte, which is mainly an aqueous solution of copper sulfate and sulfuric acid, and accumulate in the form of metal ions. These impurities typically include nickel, antimony, arsenic, and bismuth. Since these impurities are liable to electrodeposition, the practice of measuring the concentrations of these impurities in the electrolyte and refining the electrolyte so as to keep their concentrations constantly below the prescribed levels proves to be very important to achieve the desired quality of copper electrodeposit.

More particularly, about 30 to 70% of all the antimony initially contained in the anode will dissolve out of the anode into the electrolyte, while the remainder will go into the anode slime. The concentration of antimony, which has a solubility of about 1.0 to 1.5 g/lit. in an ordinary copper electrolyte ($Cu^{2+}$ ion concentration 40 to 50 g/lit., free sulfuric acid concentration 180 to 200 g/lit., and solution temperature 50° to 60° C.), will gradually increase in the electrolyte as the electrolysis proceeds. In electrolytic plants the antimony concentration is generally controlled to a range between about 0.3 and 0.6 g/lit.

Methods heretofore known for the separation of antimony from such copper electrolytes include an electrolysis method wherein the antimony is removed from the copper electrolyte in the form of a copper-removing electrolysis slime by using an insoluble anode (e.g. made of lead); a neutralization method wherein the antimony is removed in the form of a hydroxide by being hydrolyzed in the presence of sodium carbonate, for example, added thereto in advance; and a precipitation method wherein the antimony is removed in the form of a precipitated sulfide by blowing hydrogen sulfide gas into the electrolyte. These methods are for example described in the book *Copper, The Science and Technology of the Metal, Its Alloys and Compounds*, published by Reinhold Publishing Corp. (1954), the Journal of the Mining and Metallurgical Institute of Japan, Volume 97, No. 1122, and the *Handbook of Metallurgical Technique*, published by Asakura Shoten Co. Ltd. (1963). However, these methods invariably remove the antimony in conjunction with copper, arsenic, bismuth, etc. The slime obtained by any of these methods must be repeatedly treated in a preceding copper smelting process to recover the copper therein. Consequently, the greater part of the antimony is volatilized, contained into the flue dust, and piled up in most cases. Thus, the recovery of antimony in the slime has proved to be complicated, time-consuming, and very poor in separation efficiency. In addition, the antimony in the electrolyte will react with arsenic and bismuth contained in the solution to produce a white precipitate which is deposited in the form of scale on the heat transfer surfaces in the concentration facilities and on the inner surfaces of the circulating pipes. This scale is the main cause for operating troubles in such facilities and pipes.

To overcome the noted deficiencies in the prior art methods, the present inventors made a diligent study to find a method capable of providing a quick, efficient and easy separation of antimony from an antimony-containing copper electrolyte. The present invention resulted from this effort.

SUMMARY OF THE INVENTION

The present inventors have discovered that the antimony in an antimony-containing copper electrolyte can be successfully removed therefrom by contacting the solution with activated carbon. The invention is particularly applicable for antimony-containing copper electrolytes in which only an antimony concentration will reach to its control limit due to a large amount of antimony as an impurity in an anode.

BRIEF DESCRIPTION OF THE FIGURE

Accompanying FIGURE shows a graphic representation of the relationship between the ratio of separation of impurities and the feed rate of solution indicated in Table 1.

DETAILED DESCRIPTION OF THE INVENTION

The contacting of the antimony-containing copper electrolyte with activated carbon according to the present invention can be achieved either by passing the antimony-containing copper electrolyte through a column packed with the activated carbon in the form of a bed, by stirring the antimony-containing copper electrolyte and the activated carbon in a tank, or by a combination of these procedures. Any ordinary commerically available activated carbon can be used in this treatment.

With respect to the temperature of the antimony-containing copper electrolyte during the treatment with the activated carbon, the ratio of removal of antimony is slightly higher when the solution is at normal room temperature than when it is at 50° to 60° C., the temperature during the electrolysis.

The copper electrolyte from which antimony has been removed by the treatment with activated carbon may be suitably forwarded to a process for copper-removing electrolysis or to a process for copper electrolysis. The activated carbon which has been used in the separation of antimony may be regenerated with hydrochloric acid or sodium hydroxide, for example, or dried and immediately burnt, to recover antimony in the form of a solution or an oxide.

The present invention will now be described with reference to working examples.

EXAMPLE 1

A cylindrical column of transparent polycarbonate, 50 mm in diameter, was packed with a granular activated carbon produced by Kuraray Chemical Co., Ltd. and marketed under the trademark "Kuraraycoal GW" (at least 98% of the grains having 10 to 32 mesh in grain size). Upwardly through the bottom of the column was fed a copper electrolyte containing 0.58 g/lit. of Sb, 6.4 g/lit. of As, 0.60 g/lit. of Bi, 18.2 g/lit. of Ni, 45.5 g/lit. of Cu, and 202.2 g/lit. of free sulfuric acid at a temperature of 50° C. at a varying feed rate of 0.5 to 8 in SV. The electrolyte discharged through the head of the column at each feed rate was sampled and analyzed for antimony and other elements. The results of the analysis of the discharged electrolyte and the ratios of separation calculated on the basis of the analyses are shown in Table 1.

In all the test runs involved, the concentration of Ni, Cu, and free sulfuric acid were substantially equal before and after the treatment, though involving dispersions tolerable as errors. Thus, they are omitted from the results of Table 1. (This omission also applies to the following examples.) The data of Table 1 are graphically represented.

It is noted from the test results that over a very wide range of SV ratios, antimony could be separated with a high efficiency and a high selectivity from the other impurities such as arsenic and bismuth.

TABLE 1

| Electrolyte | SV ratio | Analyses (g/lit.) | | | Ratios of Separation (%) | | |
|---|---|---|---|---|---|---|---|
| | | Sb | As | Bi | Sb | As | Bi |
| Influent | — | 0.58 | 6.4 | 0.60 | — | — | — |
| Effluent | 0.5 | 0.03 | 5.7 | 0.50 | 94.8 | 10.9 | 16.7 |
| | 1 | 0.03 | 5.7 | 0.50 | 94.8 | 10.9 | 16.7 |
| | 2 | 0.09 | 6.4 | 0.55 | 84.5 | 0.0 | 8.3 |
| | 4 | 0.17 | 6.4 | 0.57 | 70.7 | 0.0 | 5.0 |
| | 8 | 0.29 | 6.4 | 0.57 | 50.0 | 0.0 | 5.0 |

EXAMPLE 2

The procedure of Example 1 was faithfully repeated, except that the feed rate of the copper electrolyte was fixed at SV 2 and two kinds of activated carbon, i.e., Yashi-Coal M (grade for use in liquid phase, 10 to 32 mesh in grain size) made by Taihei Chemical Industry Co., Ltd. and Granular Shirasagi S made by Takeda Chemical Industries, Ltd., were used. In each test run using a varying brand of activated carbon, the electrolyte discharged through the top of the column was sampled and analyzed for antimony and other elements. The results of analysis and the ratios of separation calculated on the basis of the analyses are shown in Table 2 in comparison with the comparable results obtained in the test run of Example 1.

TABLE 2

| Electrolyte | Brand of activated carbon | Analyses (g/lit.) | | | Ratios of separation (%) | | |
|---|---|---|---|---|---|---|---|
| | | Sb | As | Bi | Sb | As | Bi |
| Influent | — | 0.58 | 6.4 | 0.60 | — | — | — |
| Effluent | Kuraray-Coal GW | 0.09 | 6.4 | 0.55 | 84.5 | 0.0 | 8.3 |
| | Yashi-Coal M | 0.10 | 6.4 | 0.57 | 82.8 | 0.0 | 5.0 |
| | Granular Shirasagi S | 0.10 | 6.4 | 0.57 | 82.8 | 0.0 | 5.0 |

It is noted from the test results that the object of this invention was accomplished in spite of differences in the grade of activated carbon used.

EXAMPLE 3

The treatment with activated carbon and the analysis of effluent were carried out by faithfully following the procedure of Example 1, except that the SV ratio was fixed at 2 and the temperature of the electrolyte was fixed at room temperature (20° to 25° C.). The results are shown in Table 3 in comparison with the comparable results of the test run of Example 1.

TABLE 3

| Electrolyte | Temperature of electrolyte | Analyses (g/lit.) | | | Ratios of separation (%) | | |
|---|---|---|---|---|---|---|---|
| | | Sb | As | Bi | Sb | As | Bi |
| Influent | 50° C. | | | | | | |
| | Room temperature (20° to 25° C.) | 0.58 | 6.4 | 0.60 | — | — | — |
| Effluent | 50° C. | 0.09 | 6.4 | 0.55 | 84.5 | 0.0 | 8.3 |
| | Room temperature (20° to 25° C.) | 0.05 | 6.4 | 0.52 | 91.4 | 0.0 | 13.3 |

It is noted from the results that in all the test runs, the separation was obtained at high ratios, although the ratios were slightly lower when the temperature was 50° to 60° C. (the level during electrolysis) than when it was room temperature. Example 4

A cylindrical column of transparent polycarbonate, 80 mm in diameter, was packed with 1 liter of the same granular activated carbon, "Kuraray-Coal GW" as used in Example 1. Through the bottom of the column a copper electrolyte at 50° C. was fed upwardly at a SV ratio of 2 continuously for 96 hours. After lapses of 10, 32, 48, 64, 80 and 96 hours during the course of the treatment, the electrolyte discharged from the top of the column was sampled and analyzed for antimony and other elements. The fed copper electrolyte had the same composition as that of fed one in Example 1. The results of the analysis of the discharged electrolyte and the ratios of separation calculated on the basis of the analyses are shown in Table 4.

TABLE 4

| Electrolyte | Lapse of time (hr) | Analyses (g/lit.) | | | Ratios of separation (%) | | |
|---|---|---|---|---|---|---|---|
| | | Sb | As | Bi | Sb | As | Bi |
| Influent | — | 0.58 | 6.4 | 0.60 | — | — | — |
| Effluent | 10 | 0.02 | 5.8 | 0.50 | 96.6 | 9.4 | 16.7 |
| | 32 | 0.03 | 6.1 | 0.47 | 94.8 | 4.7 | 21.7 |
| | 48 | 0.05 | 6.0 | 0.50 | 91.4 | 6.3 | 16.7 |
| | 64 | 0.06 | 5.8 | 0.50 | 89.7 | 9.4 | 16.7 |
| | 80 | 0.08 | 6.3 | 0.52 | 86.2 | 1.6 | 13.3 |
| | 96 | 0.09 | 6.1 | 0.50 | 84.5 | 4.7 | 16.7 |

It is noted from the results that the activated carbon retained its initial separation capacity for a long time.

EXAMPLE 5

In a beaker having an inner volume of 2 liters 1 liter of a copper electrolyte containing 0.61 g/lit. of Sb, 6.7 g/lit. of As, 0.60 g/lit. of Bi, 19.6 g/lit. of Ni, 46.1 g/lit. of Cu, and 202.2 g/lit. of free sulfuric acid was placed and then stirred with granular activated carbon, "Kuraray-Coal GW," which was added thereto in varying amounts, to establish contact between the electrolyte and the activated carbon. This contacting treatment was conducted with the 2-liter beaker kept immersed in a water bath at 50° C. The amount of the activated carbon added was 5 g and 20 g and the duration of the treatment was 1, 2, and 3 hours. After the stated duration of treatment, the electrolyte was analyzed for antimony and other elements. The results were as shown in Table 5.

TABLE 5

| Electrolyte | Amount of activated carbon added (g) | Duration of treatment (hr) | Analyses (g/lit.) | | | Ratios of separation (%) | | |
|---|---|---|---|---|---|---|---|---|
| | | | Sb | As | Bi | Sb | As | Bi |
| Influent | — | — | 0.61 | 6.7 | 0.60 | — | — | — |

TABLE 5-continued

| Electrolyte | Amount of activated carbon added (g) | Duration of treatment (hr) | Analyses (g/lit.) | | | Ratios of separation (%) | | |
|---|---|---|---|---|---|---|---|---|
| | | | Sb | As | Bi | Sb | As | Bi |
| Effluent | 5 | 1 | 0.54 | 6.7 | 0.60 | 11.5 | 0.0 | 0.0 |
| | | 2 | 0.51 | 6.4 | 0.60 | 16.4 | 4.5 | 0.0 |
| | | 3 | 0.48 | 6.4 | 0.60 | 21.3 | 4.5 | 0.0 |
| | 20 | 1 | 0.37 | 6.2 | 0.58 | 39.3 | 7.5 | 3.3 |
| | | 2 | 0.33 | 6.2 | 0.58 | 45.9 | 7.5 | 3.3 |
| | | 3 | 0.33 | 6.2 | 0.58 | 45.9 | 7.5 | 3.3 |

In this example, the amounts of activated carbon used were very small as compared with those used in the method of columnar filtration involved in the preceding examples. Here again, the antimony alone was separated with high selectivity from the other impurities.

From all the test results given above, it is clear that this invention provides easy, quick separation of antimony with high efficiency and high selectivity from other impurities. From this invention, the following advantages are derived: (1) Since the treatment solely consists in making the antimony-containing copper electrolyte contact the activated carbon, the comsumption of free sulfuric acid, mingling of such extraneous metal ions as sodium ion and calcium ion in the electrolyte which are inevitably entailed by the conventional method for the removal of antimony by neutralization do not occur; (2) Where the impurity to be separated from the electrolyte is antimony, since the electrolyte from which antimony has been removed by the method of this invention can be wholly or partly forwarded suitably in its unaltered form to the process of electrolysis, the process for crude blue vitriol production and the process for copper-removing electrolysis may be either omitted or contracted, and the considerations to be inevitably paid to the regulation of balance between the concentration of copper and that of sulfuric acid in the mother liquor and the end solution during such processes are no longer required; (3) where the electrolyte mentioned in (2) above from which antimony has been removed is partly treated in the process for copper-removing electrolysis for the removal of copper, arsenic, and bismuth, generation of poisonous $H_3Sb$ (stibine) gas is no longer entailed and the current efficiency is improved by a proportion wasted on the occurrence of this gas; and (4) since the slime recovered by the process of copper-removing electrolysis mentioned in (3) above contains hardly any antimony, the treatments involved in the process for the copper-arsenic compound production and the process for arsenous acid recovery which use the slime as the raw material can be simplified.

What is claimed is:

1. A method for the preferential removal of antimony from a copper electrolyte which contains nickel, antimony, arsenic and bismuth impurities, the method including the step of contacting said copper electrolyte with activated carbon whereby the antimony becomes associated with the activated carbon.

2. The method according to claim 1, wherein the step of contacting said copper electrolyte with the activated carbon is effected by passing said copper electrolyte through a column packed with said activated carbon in the form of a bed.

3. The method according to claim 1, wherein the step of contacting said copper electrolyte with the activated carbon is effected by stirring said copper electrolyte and said activated carbon in a vessel.

4. The method according to claim 1, wherein the step of contacting said copper electrolyte with said activated carbon is carried out at a temperature ranging from room temperature to 60° C.

5. The method of claim 4, wherein said temperature ranges from room temperature to 50° C.

6. The method according to claim 1, wherein after said contacting step the activated carbon with associated antimony is contacted with hydrochloric acid so as to separate the antimony therefrom.

7. The method according to claim 1, wherein after said contacting step the activated carbon is dried and immediately burnt so as to separate the antimony therefrom.

8. A method for the preferential removal of antimony from a copper electrolyte which contains nickel, antimony, arsenic and bismuth impurities, the method including the steps of contacting said copper electrolyte with activated carbon whereby the antimony becomes associated with the activated carbon, and then contacting the activated carbon having associated antimony with sodium hydroxide so as to separate the antimony therefrom.

* * * * *